US012722834B2

(12) United States Patent
Onodera et al.

(10) Patent No.: US 12,722,834 B2
(45) Date of Patent: Sep. 1, 2026

(54) FEEDING DEVICE FOR FLOWABLE MATERIAL

(71) Applicant: TOYOTA JIDOSHA KABUSHIKI KAISHA, Toyota (JP)

(72) Inventors: Hidekatsu Onodera, Toyota (JP); Ryoji Oshima, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 289 days.

(21) Appl. No.: 18/629,238

(22) Filed: Apr. 8, 2024

(65) Prior Publication Data

US 2024/0383631 A1 Nov. 21, 2024

(30) Foreign Application Priority Data

May 17, 2023 (JP) ................................ 2023-081848

(51) Int. Cl.
*B65B 69/00* (2006.01)
*B65B 57/00* (2006.01)
*B67D 7/64* (2010.01)

(52) U.S. Cl.
CPC ............ *B65B 69/005* (2013.01); *B65B 57/00* (2013.01); *B67D 7/645* (2013.01)

(58) Field of Classification Search
CPC ........ B65B 69/005; B65B 57/00; B67D 7/645
USPC .......................................................... 414/403
See application file for complete search history.

(56) References Cited

U.S. PATENT DOCUMENTS 5,078,304 A * 1/1992 Schneider ............ B67D 7/0227 222/386
2005/0152787 A1* 7/2005 Oglesby .................. F04B 15/02 417/18
2016/0016786 A1* 1/2016 Sauer ................... B67D 7/0227 137/565.17
2023/0398602 A1* 12/2023 Gerner ................... B22D 18/04

FOREIGN PATENT DOCUMENTS

JP 2006-322359 A 11/2006
JP 2017-159207 A 9/2017

* cited by examiner

*Primary Examiner* — Ahshik Kim
(74) *Attorney, Agent, or Firm* — Oblon, McClelland, Maier & Neustadt, L.L.P.

(57) ABSTRACT

A feeding device for a flowable material is provided with a platen housed in a container containing the flowable material, a cylindrical ram attached to the platen, a pump that reciprocates a piston housed in the ram to suck up the flowable material in the container and a determination device configured to determine a replacement time of the container based on a change in a moving speed of the piston.

4 Claims, 5 Drawing Sheets

FEEDING DEVICE FOR FLOWABLE MATERIAL

FIELD

The present disclosure relates to a feeding device for a flowable material.

BACKGROUND

JP2017-159207A discloses a conventional feeding device for a flowable material, which feeds the flowable material in a container to outside of the container and determines a replacement time of the container, based on a change in a pressure of the flowable material measured by a pressure sensor.

SUMMARY

However, in the above-described conventional feeding device for the flowable material, it is necessary to bring a pressure-sensitive element of the pressure sensor into contact with the flowable material in order to detect the pressure of the flowable material. Therefore, there is a possibility that the flowable material is fixed to the pressure-sensitive element by continuous use of the pressure sensor. As a result, there is a possibility that a measurement accuracy of the pressure sensor may decrease and a replacement time of the container may not be properly determined.

The present disclosure was made focusing on such a problem point and has as its object to enable determination of a proper replacement time of the container without measuring a pressure of the flowable material in the container.

To solve this technical problem, a feeding device for a flowable material according to one aspect of the present disclosure is provide with a platen housed in a container containing the flowable material, a cylindrical ram attached to the platen, a pump that reciprocates a piston housed in the ram to suck up the flowable material in the container and a determination device configured to determine a replacement time of the container based on a change in a moving speed of the piston.

According to this aspect of the present disclosure, it is possible to determine the proper replacement time of the container based on the change in the moving speed of the piston without measuring the pressure of the flowable material in the container.

DESCRIPTION OF EMBODIMENTS

Figure 1:
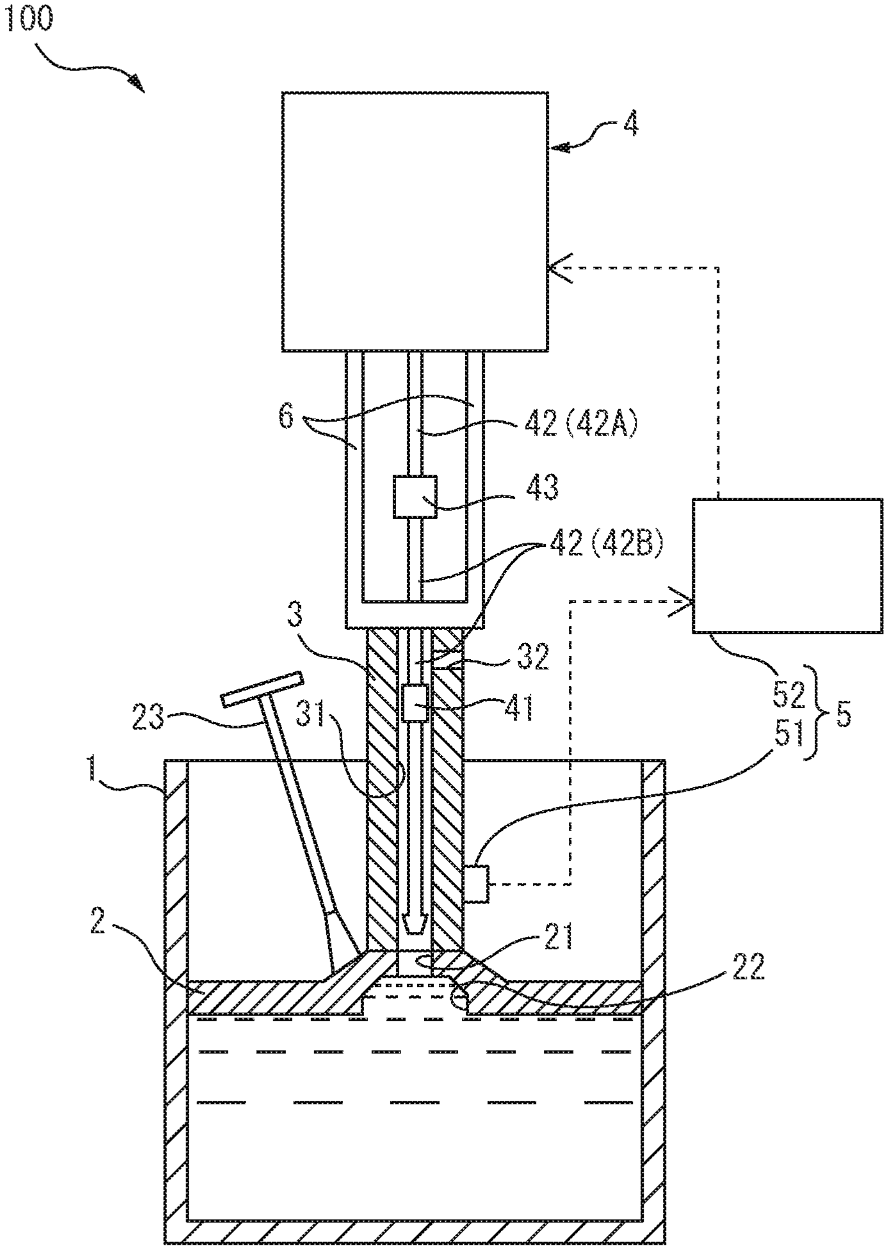
FIG. 1 is a schematic view of the configuration of a feeding device for a flowable material according to a first embodiment of the present disclosure.

Below, referring to the drawings, an embodiment of the present disclosure will be explained in detail. Note that, in the following explanation, similar component elements will be assigned the same reference notations.

First Embodiment

FIG. 1 is a schematic view of the configuration of a feeding device 100 for a flowable material according to a first embodiment of the present disclosure.

The feeding device 100 for the flowable material according to the present embodiment is provided with a platen 2 housed in a container 1 containing the flowable material such as an adhesive, a sealing material, or a molding material, a cylindrical ram 3 attached to the platen 2, a pump 4 configured to move a piston valve 41 housed in the ram 3 up and down to suck up the flowable material in a container 1, and a determination device 5 configured to determine a replacement time of the container 1. In the following description, for convenience, the opening side of the container 1 is referred to as an upper side, and the bottom side of the container 1 is referred to as a lower side.

The platen 2 is, for example, a plate-shaped body made of metal. The platen 2, for example, has an opening portion 21 in its center that passes vertically through the platen 2. On the lower side of the opening portion 21, for example, a hemispherical depression (hereinafter, referred to as "suction portion") 22 is formed. The platen 2 is housed in the container 1 so as to be able to move downward with a decrease in the flowable material in the container 1 while the side surface thereof is in contact with the inner wall surface of the container 1.

The platen 2 is inserted into the container 1 from the upper side of the container 1 containing the flowable material so that the bottom surface of the platen 2 is in contact with the flowable material in the container 1. There is possibility that air may be mixed into the suction portion 22 when the platen 2 is inserted or the like. Therefore, the platen 2 is provided with an air vent mechanism 23 for discharging the mixed air from the suction portion 22 to the outside.

The ram 3 is, for example, a cylindrical body made of metal. The ram 3 is formed so that an inner diameter of the hollow portion 31 of the ram 3 coincides with an opening diameter of the opening portion 21 of the platen 2, and is attached to the upper side of the opening portion 21 of the platen 2. An outlet hole 32 is formed in the upper portion of the ram 3 for feeding the flowable material pumped up from the suction portion 22 into the hollow portion 31 of the ram 3 to the outside. A piston valve 41 attached to the rod 42 is slidably housed in the hollow portion 31 of the ram 3 with respect to the ram 3.

The pump 4 is mounted on the upper side of the ram 3 via stud bolt 6. The pump 4 moves the rod 42 up and down (reciprocates) by power such as a motor (not shown). The rod 42 according to the present embodiment has an upper rod 42A extending downward from the power portion of the pump 4, and a lower rod 42B provided with the piston valve 41 housed in the ram 3, and has a configuration in which the upper rod 42A and the lower rod 42B are connected by a coupling reaction (shaft coupling) 43. The pump 4 moves the rod 42 up and down, and moves the piston valve 41 provided in the lower rod 42B up and down in the hollow portion 31 of the ram 3, thereby changing the volume in the hollow portion 31. As a result, the flowable material in the suction portion 22 is sucked up into the hollow portion 31 of the ram 3, and the sucked-up flowable material is discharged to the outside through the outlet hole 32.

Here, if it is not possible to properly determine that the flowable material in the container 1 has disappeared, i.e., that the replacement time of the container 1 has arrived, the drive of the pump 4 is continued even after the flowable material in the container 1 has disappeared, so that there is a possibility the air sucked up by the pump 4 may continue to be discharged from the outlet hole 32. Therefore, the feeding device for the flowable material 100 according to the present embodiment includes the determination device 5 configured to determine a proper replacement time of the container 1 and stop the pump 4.

The determination device 5 according to the present embodiment is provided with a vibration sensor 51 and an electronic control unit 52.

The vibration sensor 51 detects vibration generated by a vertical movement of the piston valve 41. In the present embodiment, the vibration sensor 51 is attached to the outer surface of the ram 3. However, the vibration sensor 51 can be attached at any position where vibration generated by the vertical movement of the piston valve 41 is transmitted.

The electronic control unit 52 is a microcomputer with a central processing unit (CPU), a read only memory (ROM), a random access memory (RAM), an input-port, and an output-port interconnected by a bi-directional bus. A vibration data acquired by the vibration sensor 51 is input to the input port, and the pump 4 is connected to the output port via a pump driving circuit (not shown).

Figure 2:
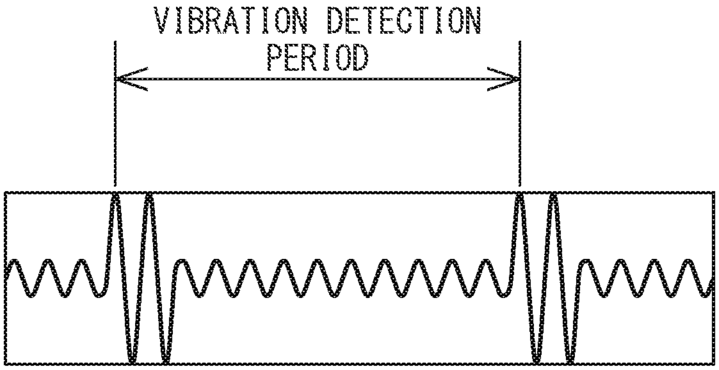
FIG. 2 is a view showing a vibration data acquired when sufficient flowable material remains in a container.
Figure 3:
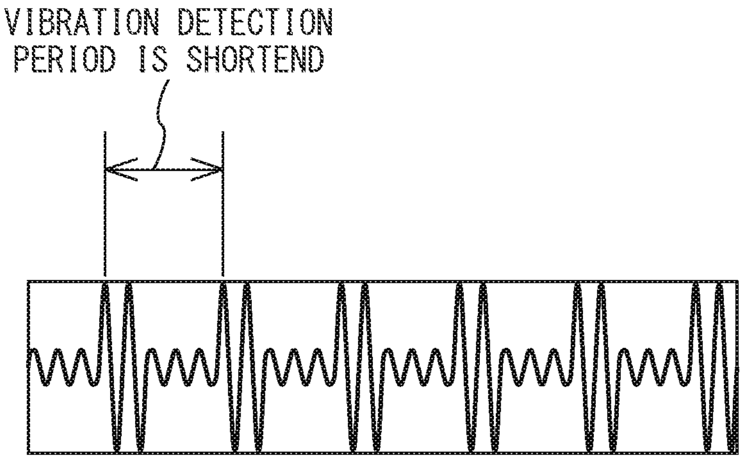
FIG. 3 is a view showing a vibration data acquired when a container is substantially empty.

FIG. 2 and FIG. 3 are views showing the vibration data acquired by the vibration sensor 51, respectively. More specifically, FIG. 2 is a view showing the vibration data acquired when sufficient flowable material remains in the container 1. FIG. 3 is a view showing the vibration data obtained when the flowable material in the container 1 is reduced and the container 1 is substantially emptied.

As shown in FIG. 2 and FIG. 3, when the piston valve 41 is moved up and down in the hollow portion 31 of the ram 3 by driving the pump 4, a large vibration (vibration whose amplitude value is equal to or greater than a predetermined threshold value) is generated at a timing at which a vertical movement of the piston valve 41 is switched, that is, at a timing at which the piston valve 41 reaches the top dead center position and the bottom dead center position. Therefore, when the pump 4 is driven at a constant power, a large vibration is detected at a constant cycle.

When the flowable material in the container 1 is reduced and the container 1 is substantially empty, there is no flowable material that can be sucked up from the suction portion 22, and thus the viscous resistance when the piston valve 41 is moved up and down in the hollow portion 31 of the ram 3 is reduced. Therefore, when the pump 4 is driven at a constant power, the moving speed of the piston valve 41 is increased as compared to before the inside of the container 1 is emptied. Therefore, as shown in FIG. 3, when the flowable material in the container 1 is reduced and the inside of the container 1 is substantially empty, a period in which the large vibration is detected is shortened. Therefore, by calculating the period of the large vibration generated when the piston valve 41 reaches the top dead center position and the bottom dead center position, it is possible to properly determine the replacement time of the container 1 by detecting the change in the moving speed of the piston valve 41.

Figure 4:
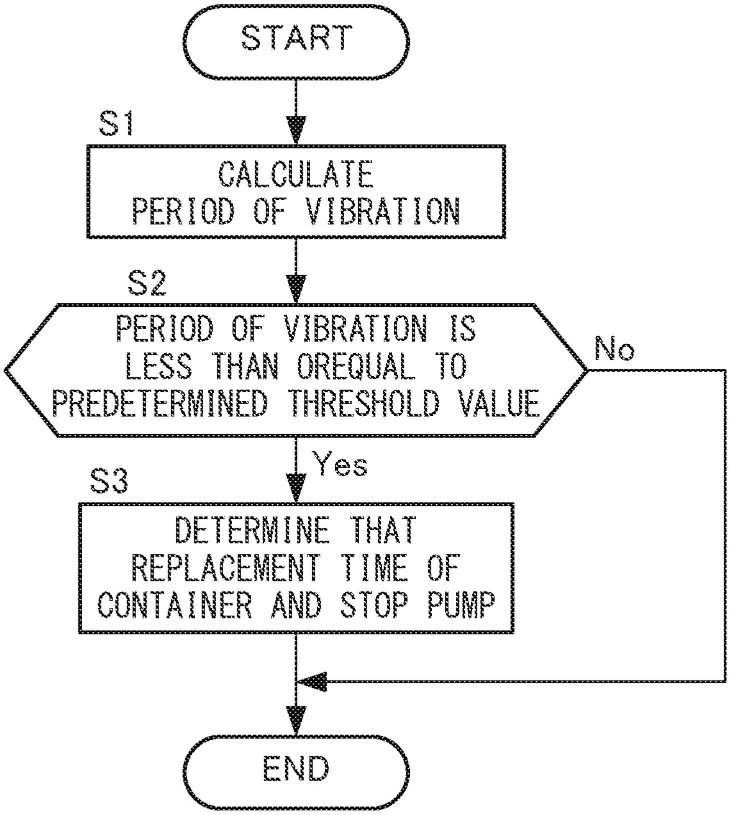
FIG. 4 is a flow chart explaining details of a determination process for determining a replacement time of a container.

Therefore, in the present embodiment, the period of the large vibration generated when the piston valve 41 reaches the top dead center position and the bottom dead center position is calculated based on the vibration data acquired by the vibration sensor 51, and when the calculated period becomes equal to or less than the predetermined threshold value, it is determined that the replacement time of the container 1 has arrived and the pump 4 is stopped. FIG. 4 is a flow chart explaining details of a determination process for determining the replacement time of the container 1.

At step S1, the electronic control unit 52 calculates the period of the large vibration (vibration whose amplitude value is equal to or larger than the predetermined threshold value) generated when the piston valve 41 reaches the top dead center position and the bottom dead center position based on the vibration data acquired by the vibration sensor 51.

At step S2, the electronic control unit 52 determines whether the period of the large vibration is less than or equal to the predetermined threshold value. When the period of the large vibration is equal to or less than the predetermined threshold value, the electronic control unit 52 proceeds to the processing of step S3. On the other hand, the electronic control unit 52 ends the current processing when the period of the large vibration is larger than the predetermined threshold value.

At step S3, the electronic control unit 52 determines that the replacement time of the container 1 has arrived and stops the pump 4. At this time, along with the stop of the pump 4, the operator may be notified of the arrival of the replacement time of the container 1 by sound, display screen, or the like.

The feeding device for the flowable material according to the present embodiment explained above is provided with the platen 2 housed in a container 1 containing the flowable material, the cylindrical ram 3 attached to the platen 2, the pump 4 that reciprocates the piston valve 41 (piston) housed in the ram 3 to suck up the flowable material in the container 1 and the determination device 5 configured to determine the replacement time of the container 1 based on the change in the moving speed of the piston valve 41.

Specifically, the determination device 5 is configured to determine that a time for replacing the container 1 has arrived when the amount of the change in the moving speed of the piston valve 41 becomes equal to or greater than a predetermined amount. Further, the determination device 5 is provided with the vibration sensor 51 mounted at an arbitrary position to which vibration generated by reciprocation of the piston valve 41 is transmitted, and the electronic control unit 52 configured to calculate a period of vibration generated when the piston valve 41 moves to a top dead center and a bottom dead center based on a detection value of the vibration sensor 52 and to detect a change in the moving speed of the piston valve 41 based on the period.

Thus, according to the present embodiment, without measuring the pressure of the flowable material in the container 1, for example, by calculating the period of the large vibration generated when the piston valve 41 reaches the top dead center position and the bottom dead center position, it is possible to determine the appropriate replacement time of the container 1 by detecting the change in the moving speed of the piston valve 41. Therefore, since it is not necessary to bring the vibration sensor 51 into contact with the flowable material in order to detect a change in the moving speed of the piston valve 41, it is possible to suppress a decrease in the accuracy of the determination of the replacement timing due to the fixing of the flowable material. Further, since there is no fear that the flowable material is fixed to the vibration sensor 51, maintenance work such as fixing confirmation is not required.

Second Embodiment

Next, a second embodiment of the present disclosure will be explained. The present embodiment differs from the first embodiment on the point of detecting a change in the moving speed of the piston valve 41 by a photoelectric sensor 53. Below, the explanation will be given focusing on this point of difference.

Figure 5:
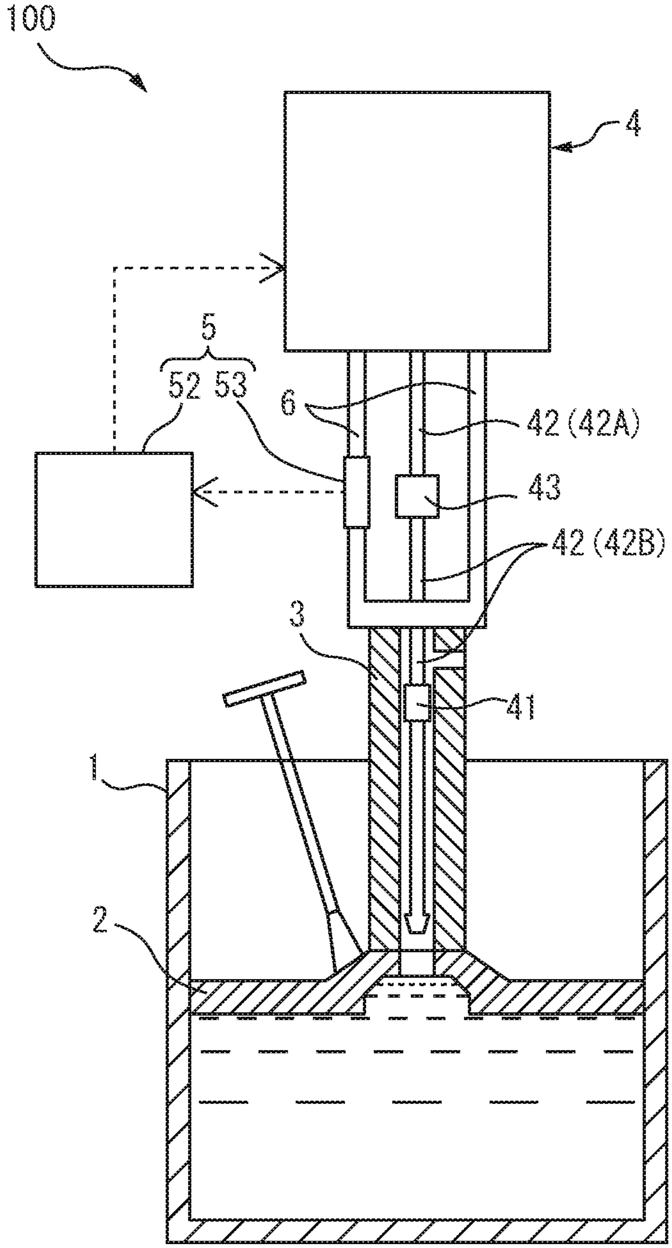
FIG. 5 is a schematic view of the configuration of a feeding device for a flowable material according to a second embodiment of the present disclosure.

FIG. 5 is a schematic view of the configuration of a feeding device 100 for a flowable material according to the second embodiment of the present disclosure.

As shown in FIG. 5, the determination device 5 of the feeding device 100 for the flowable material according to the present embodiment includes, instead of the vibration sensor 51, a photoelectric sensor 53 that detects an object based on the reflected light when the light is irradiated.

The photoelectric sensor 53 is disposed at a position capable of irradiating an arbitrary point on the movement locus of an interlocking component that moves in conjunction with the piston valve 41, and detects the passage of the interlocking component. In the present embodiment, the photoelectric sensor 53 is attached to the stud bolt 6 that connects the pump 4 and the ram 3, and detects the passage of the interlocking component on the upper rod 42A located outside the ram 3, specifically, the coupling 43 that connects the upper rod 42A extending downward from the side of the pump 4 and the lower rod 42B disposed in the ram 3.

Figure 6:
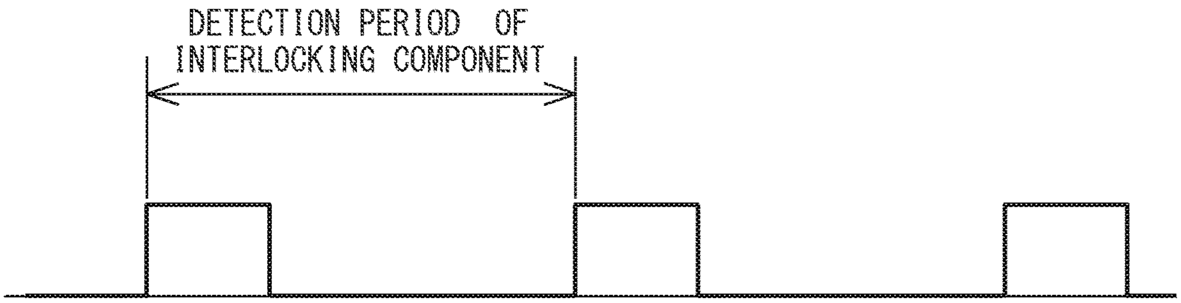
FIG. 6 is a view showing a detection data of a coupling acquired by a photoelectric sensor when sufficient flowable material remains in a container.
Figure 7:
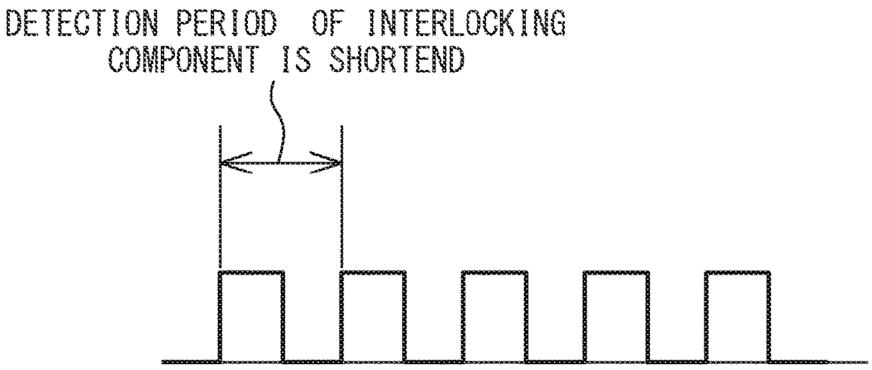
FIG. 7 is a view showing a detection data of a coupling acquired by a photoelectric sensor when a container is substantially empty.

FIG. 6 and FIG. 7 are views showing vibration data acquired by the photoelectric sensor 53, respectively. More specifically, FIG. 6 is a view showing a detection data of a coupling acquired by the photoelectric sensor 53 when sufficient flowable material remains in a container 1. FIG. 7 is a view showing a detection data of a coupling acquired by a photoelectric sensor 53 when the flowable material in the container 1 is reduced and the container 1 is substantially emptied.

As described above, when the flowable material in the container 1 decreases and the inside of the container 1 becomes substantially empty, the viscous resistance when the piston valve 41 is moved up and down in the hollow portion 31 of the ram 3 decreases, and therefore, when the pump 4 is driven at a constant power, the moving speed of the piston valve 41 increases. Therefore, when the inside of the container 1 becomes substantially empty as shown in FIG. 7, the detection period of the coupling 43, which is an interlocking component, is shorter than when sufficient flowable material remains in the container 1 as shown in FIG. 6.

Accordingly, as in the present embodiment, the detection period of the coupling 43 is calculated based on the detection data of the coupling 43 acquired by the photoelectric sensor 53, and when the detection period becomes equal to or less than the predetermined threshold value, even if it is determined that the replacement time of the container 1 has arrived, it is possible to obtain the same operation and effect as in the first embodiment.

In other words, in the present embodiment, the determination device 5 is provided with the determination device 5, the photoelectric sensor 53 configured to detect the passage of the coupling 43 by irradiating a point on the motion locus of the coupling 43 (interlocking component) which moves in conjunction with the piston valve 41, and the electronic control unit 52 configured to calculate the detection period of the coupling 43 based on the detection result of the photoelectric sensor 53 and to detect the change in the moving speed of the piston valve 41 based on the detection period. Even with such a configuration, it is possible to obtain the same operation and effect as in the first embodiment.

While embodiments of the present disclosure are described above, it should be noted that these embodiments are merely examples of application of the present disclosure, and are not meant to limit the technical scope of the present disclosure to the specific constitutions of the embodiments.

The invention claimed is:

1. A feeding device for a flowable material, comprising:
a platen housed in a container containing the flowable material;
a cylindrical ram attached to the platen;
a pump that reciprocates a piston housed in the ram to suck up the flowable material in the container; and
a determination device configured to determine a replacement time of the container based on a change in a moving speed of the piston, wherein
when an amount of change in the moving speed of the piston becomes equal to or greater than a predetermined amount, the determination device is configured to determine that a time for replacing the container has arrived.

2. A feeding device for a flowable material, comprising:
a platen housed in a container containing the flowable material;
a cylindrical ram attached to the platen;
a pump that reciprocates a piston housed in the ram to suck up the flowable material in the container; and
a determination device configured to determine a replacement time of the container based on a change in a moving speed of the piston, wherein
the determination device comprises:
a vibration sensor mounted at an arbitrary position to which vibration generated by reciprocation of the piston is transmitted; and
an electronic control unit configured to calculate a period of vibration generated when the piston moves to a top dead center and a bottom dead center based on a detection value of the vibration sensor, and to detect a change in the moving speed of the piston based on the period.

3. A feeding device for a flowable material, comprising:
a platen housed in a container containing the flowable material;
a cylindrical ram attached to the platen;
a pump that reciprocates a piston housed in the ram to suck up the flowable material in the container; and
a determination device configured to determine a replacement time of the container based on a change in a moving speed of the piston, wherein
the determination device comprises:
a photoelectric sensor configured to detect passage of an interlocking component by irradiating a point on a motion locus of the interlocking component that moves in conjunction with the piston; and
an electronic control unit configured to calculate a detection period of the interlocking component based on a detection result of the photoelectric sensor, and to detect a change in the moving speed of the piston based on the detection period.

4. A feeding device for a flowable material according to claim 3, wherein the pump includes a first rod reciprocated by power of the pump, and a second rod connected to the first rod and provided with the piston housed in the ram, and the interlocking component is a coupling that is disposed outside the ram and connects the first rod and the second rod.

* * * * *